US011645426B2

(12) United States Patent
Szkatulski et al.

(10) Patent No.: US 11,645,426 B2
(45) Date of Patent: May 9, 2023

(54) MANAGING AND PROTECTING CHARGING STATIONS FOR DRONES

(71) Applicant: International Business Machines Corporation, Armonk, NY (US)

(72) Inventors: Jennifer L. Szkatulski, Rochester, MI (US); Shikhar Kwatra, San Jose, CA (US); Vijay Ekambaram, Chennai (IN); Padmanabha Venkatagiri Seshadri, Mysore (IN); Vijay Kumar Ananthapur Bache, Bangalore (IN); Atul Mene, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 17/155,837

(22) Filed: Jan. 22, 2021

(65) Prior Publication Data

US 2022/0237327 A1     Jul. 28, 2022

(51) Int. Cl.
*G06F 21/00* (2013.01)
*G06F 21/70* (2013.01)
*G06F 21/44* (2013.01)

(52) U.S. Cl.
CPC .............. *G06F 21/70* (2013.01); *G06F 21/44* (2013.01)

(58) Field of Classification Search
CPC ................................ G06F 21/44; G06F 21/70
See application file for complete search history.

(56) References Cited

U.S. PATENT DOCUMENTS

| | | |
|---|---|---|
| 9,387,928 B1 | 7/2016 | Gentry et al. |
| 9,499,265 B2 | 11/2016 | Sanz et al. |
| 9,573,701 B2 | 2/2017 | Beardsley et al. |
| 9,840,340 B2 | 12/2017 | O'Toole |
| 10,112,712 B1 | 10/2018 | Gentry |
| 10,155,587 B1 | 12/2018 | Tang |
| 10,479,528 B1 | 11/2019 | Liang |
| 2015/0183528 A1 | 7/2015 | Walsh et al. |
| 2017/0050748 A1* | 2/2017 | Byers .................... G08G 5/006 |
| 2017/0166067 A1 | 6/2017 | Panopoulos |
| 2017/0344000 A1 | 11/2017 | Krishnamoorthy |
| 2017/0355459 A1 | 12/2017 | Erickson |
| 2018/0186473 A1 | 7/2018 | Erickson |
| 2019/0028904 A1* | 1/2019 | Carpenter ............. H04W 16/26 |
| 2019/0190291 A1 | 6/2019 | Waters |

OTHER PUBLICATIONS

Anonymous, "Drones power charging system," IP.com Disclosure No. IPCOM000248581D, Publication Date: Dec. 20, 2016, 6 pages.
"Skysense announcing New high power Outdoor Charging Pad," sUAS News—The Business of Drones, Aug. 9, 2019, 3 pages.

(Continued)

*Primary Examiner* — Philip J Chea
*Assistant Examiner* — Rodman Alexander Mahmoudi
(74) *Attorney, Agent, or Firm* — VanLeeuwen & VanLeeuwen; Anthony M Pallone

(57) ABSTRACT

An approach is provided to manage in-flight drones. The approach identifies a drone at a drone charging station with the identified drone being unauthorized to be at the drone charging station. Responsively, the approach then secures the identified drone and removes the identified drone from the drone charging station.

17 Claims, 7 Drawing Sheets

(56) References Cited

OTHER PUBLICATIONS

Jeffrey, "Nesting platform takes smart drone capabilities to new heights," New Atlas, Feb. 17, 2016, 9 pages.
"Drone Charging Station, Mobile UAV Charging Station" CASEcruzer, 2015, 4 pages.
Degrasse, "Amazon sees cell towers as drone charging stations," RCE Wireless News, Jul. 25, 2016, 5 pages.
Choi et al., "Automatic Wireless Drone Charging Station, Creating Essential Environment for Continuous Drone Operation," 2016 International Conference on Control, Automation and Information Sciences (ICCAIS), pp. 132-136. IEEE, Ansan, Korea, Oct. 2016.
Oswald, "Check out this batteryless drone prototype that relies entirely on wireless charging," Emerging Tech, Sep. 23, 2016, 6 pages.
"Adhesives and Sealants 101: Hot Melts," ASI Adhesives & Sealants Industry, Oct. 1, 2008, 4 pages.

* cited by examiner

MANAGING AND PROTECTING CHARGING STATIONS FOR DRONES

BACKGROUND

An unmanned aerial vehicle (UAV), commonly known as a "drone," is an aircraft without a human pilot on board and a type of unmanned vehicle. Drones are part of a system; which include the drone, a ground-based controller, such as a human operator, and a system of wireless communications between the two. The flight of drones may operate with various degrees of autonomy, either under remote control by a human operator, autonomously by onboard computers, or piloted by an autonomous ground-based controller. Drones are often powered by on-board rechargeable batteries that need to be charged, generally at a ground-based charging station, when the battery power becomes low. Drones charging stations are needed to charge drones. A service can be provided by a third party to charge drones owned or operated by other entities with the third-party service provider charging drone owners for use of the charging station. With the proliferation of drones in various industries, such as package delivery, more charging stations are likely needed.

BRIEF SUMMARY

An approach is provided to manage in-flight drones. The approach identifies a drone at a drone charging station with the identified drone being unauthorized to be at the drone charging station. Responsively, the approach then secures the identified drone and removes the identified drone from the drone charging station.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
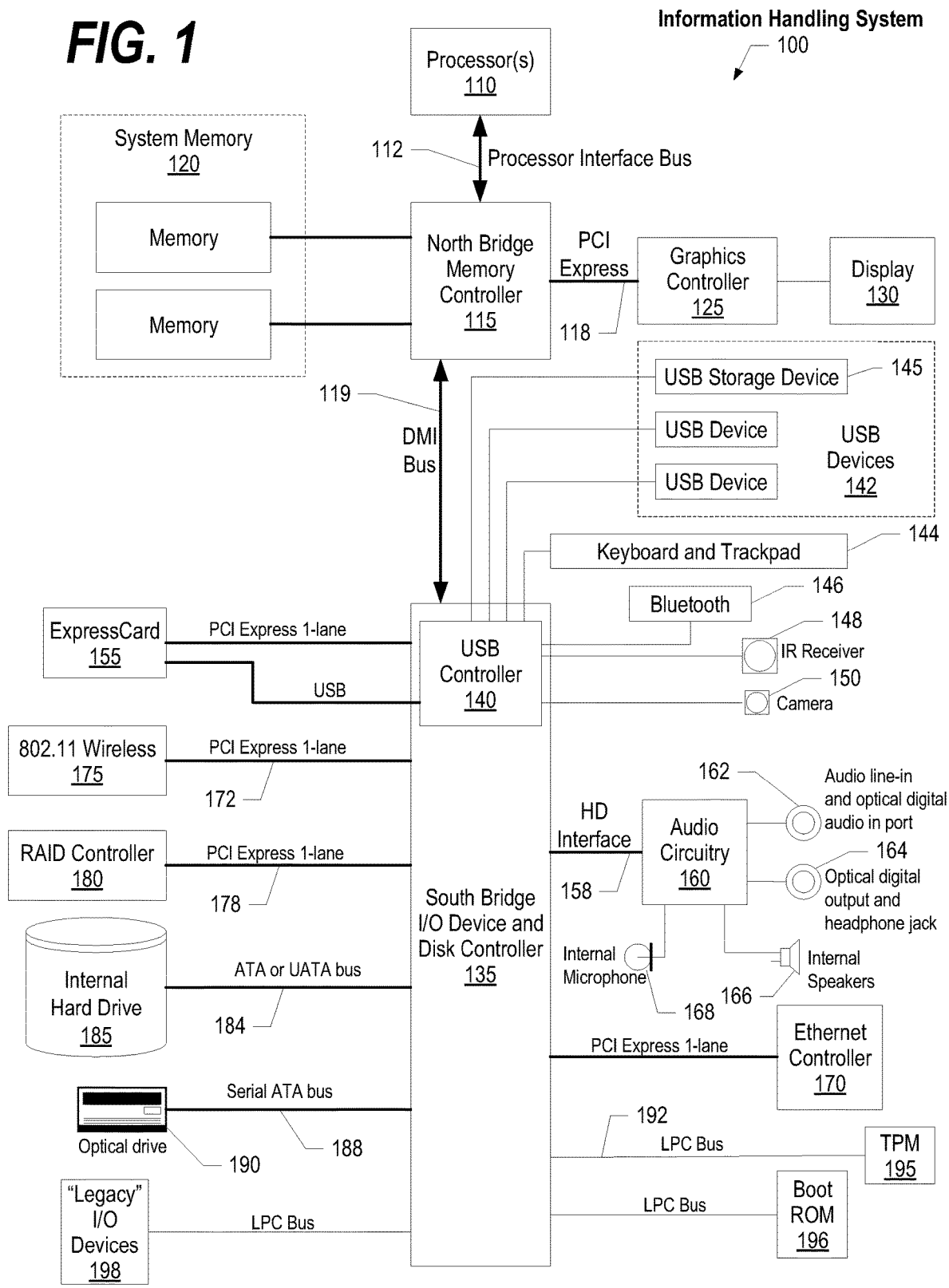
FIG. 1 is a block diagram of a data processing system in which the methods described herein can be implemented.

FIGS. 1-7 depict an approach that manages charging stations utilized by drones. Charging stations for drones have become the new focus for drone-startups, as drones are proliferating in their applications. Charging stations even support wireless charging. However, there is a need for a system to manage these charging stations in a scenario of many drones using monetized and shared charging stations. Existing technology provides trends in terms of design and development of charging station technology, but these lack management technology. There is no mechanism to manage these charging stations in terms of scheduling the drones to these stations and ensuring physical access control to charging services based on contextual situation and needs.

The approach provides the service by providing scheduling of drones to charging stations as well as providing physical access control that can remove a malfunctioning drone from a charging station so that other drones can utilize the charging station. In one embodiment, the owner of the malfunctioning drone is contacted so that arrangements can be made for return of the malfunctioning drone to the owner. The approach operates in an environment where a set of drones in the air obtain charging services from a set of charging stations distributed over a geographical area. Within this context, the charging stations are protected from malfunctioning drones that, for whatever reason, do not leave a charging station. The malfunctioning drone may be broken or a problem may exist in another component, such as communication failure to an operator of the drone. Such malfunctioning drones may be at a charging station either with or without permission of the charging station manager. The approach effectively, and safely, removes a drone from a charging station if the drone does not leave the station when expected to do so. The charging station manager often will not understand the reason for a drone to fail to leave a charging station. Because of this, the approach removes such drones from charging stations and, in one embodiment, informs the owner that the drone appears to be malfunctioning so that arrangements can be made for the drone owner to physically re-obtain the malfunctioning drone.

The approach includes a charging session scheduler module. This module receives the locations of the drones, and other parameters such as their speed, flight path, remaining battery reserve etc. and computes a cost function with respect to each charging station which reflects the effort involved in the drone reaching the charging station, and cost of charging. A bipartite matching algorithm is applied to compute an optimal schedule, and according to this schedule the drones are directed towards these assigned charging stations.

Authentication pad sub-system: This sub-system is meant to work as "fly-paper" which retains malfunctioning drones so that such malfunctioning drones cannot cause harm to themselves, other drones, or the charging stations and charging robots. The sub-system includes the following components:

Authentication pad: This device is a layered pad, with the top-most layer made up of material which could turn into glue (and hold anything on top of it) when heated, and hardens as it cools (e.g., a plastic glue stick, etc.). The layer below is made of heating coils which supply the heat for the glue. The third layer is the circuitry which can programmatically turn on/off these heating coils. The final layer is a wireless device which has directional transceiver pointing upwards. The pad is divided into cells as shown in the figure, each capable of housing a drone.

Charging robot: This device has a retractable, movable arm at the tip of which is a charging interface (contact based or wireless). The robot is mobile so as to move into charging position or to move away from the threat. There is a class of adhesives under thermo-plastic adhesives called holt-melt adhesives which could be used to adhere the malfunctioning drone to the pad. Some examples of chemicals in this class include Ethylene-vinyl acetate (EVA) copolymers, Polyolefins, Polyamides and polyesters, and Polyurethanes.

Selection of the adhesive is based on properties of these chemicals in terms of set-time (time to form bond), tack (degree of stickiness), etc. There are several applications of these adhesives even in heavy industries such as woodworking, and the automotive sector.

The approach involves the following steps. Optimizing Charging stations allocation is a step performed upon successful authentication of a drone. This step reviews the attributes listed below before assigning a drone to a charging station: (1) total number of charging stations; (2) station availability based on remaining time; (3) total number of drones in queue for charging; (4) % of battery to be charged for drones in queue; (5) battery life; and (6) the charging request.

This process calculates the time required and distributes the charging requests to different stations to ensure drones get charged in shortest time.

An example is provided below where Drone 101 is Authenticated @ 1 pm and requires 50% battery charge and Drone 102 is Authenticated @ 1:02 pm and requires 90% battery charge. In this example, the drones might be assigned as follows:

| Station # | Station Availability | Next in Queue |
| --- | --- | --- |
| Station1 | 1:05pm | Drone 102 |
| Station2 | 1:10pm | Drone 101 |

Drone 102 might be scheduled for charging before drone 101 because it is lower on charge and might not be able to wait for a charging station before it runs out of charge.

When multiple drones arrive at the charging service, a protocol is performed by the above sub-system. In the protocol, the drones are guided to the authentication-pad and allocated a cell within it. In one embodiment, the drones possess a private key. Each landed drone is pinged by the wireless device of the cell after sensing that the cell is occupied (such as by using sensors such as pressure/weight sensors, or cameras), for authentication with a cell-id. The drone authenticates itself by returning an encrypted private key back to the wireless device. Using public key encryption (wherein a public and private key are generated by the charging station manager), the public key is published for all drones to know, while the private key is kept secret) is adopted for this purpose. The private-key of the drone is encrypted using the published public-key of the station, and transmitted by the drone to the station. The station then decrypts it using its private key. This is verified by the device.

If the verification fails, then the drone charging manager initiates a drone holding protocol to hold the malfunctioning drone so that it cannot harm itself, other drones, or the charging station. The drone holding protocol includes instructing the electrical control layer for the heating coils to initiate heating and melt the top-layer of the cell. The material is allowed to melt and harden quickly in order to affix the malfunctioning drone to the charging station pad. If the verification is successful, then the charging robot is instructed to record the cell-id to provide charging services to the verified drone.

By now, all non-authenticated drones are immobilized, while authenticated drones await the charging. The mobile-charging robot moves into provide charging for authenticated drones, according to their charging credits. Any drone which continues to stay-on even after charging is deemed to be malfunctioning and is held using the drone holding protocol described above.

Consider a scenario wherein a group of drones (say A, B, M) request charging services. The approach first schedules these drones to charging stations that are best in terms of charging cost and effort to reach the charging station. The method then authenticates the drones. Let A and B be properly operating drones and M is a malfunctioning drone.

The approach requests that the drones land on the assigned authentication-pad. Drones A and B authenticate themselves and are charged by the mobile charger and fly away. If the malfunctioning drone M does not land, then it will not receive the charging services and will not be able to deny service to the charging station by other drones. If malfunctioning drone M lands on the authentication-pad, then the pad authenticates the drone using the directional ping. If the ping is not authenticated, then the drone is deemed to be malfunctioning and the drone holding protocol described above is activated. If malfunctioning drone M authenticates, but does not leave the charging pad when finished charging, the drone holding protocol is used, as described above, to hold the malfunctioning drone and prevent it from harming itself, other drones, or the charging stations. The charging robots can retrieve and replace pads affixed to malfunctioning drones with extra pads that can be kept on-site. The charging station can inform a human user when the pad supply becomes low so that the pads can be replaced manually by a scheduled delivery. The mobile charging robot could move in/out as and when required to provide services or retreat to safety, thus placing itself away from any harm that might be caused by the malfunctioning drone.

The approach for managing and protecting charging stations for drones can be summarized as follows. First, a management module assigns the drones to charging stations such that their service cost and effort are minimized. The approach further guides these drones along flight paths to the assigned charging stations. Second, once the drones reach the charging stations, they are directed to land on a special authentication-pad which authenticates them and monitors the drones in order to take actions to hold the drone if the drone is deemed to malfunction. In one embodiment, when drone malfunctioning is observed, such drones are immobilized by a heating-triggered glue apparatus. In a further embodiment, the owner or operator of the malfunctioning drone can be notified so that arrangements can be made to physically reobtain possession of the malfunctioning drone by the owner.

The robotic charging station is mobile and moves in/out to provide charging service or retreat when possibly threatened by a malfunctioning drone. The charging station charges each authenticated drone landed on the assigned pad according to their payment.

Embodiments of the present invention may be a system, a method, and/or a computer program product. The computer program product may include a computer readable storage medium (or media) having computer readable program instructions thereon for causing a processor to carry out aspects of embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
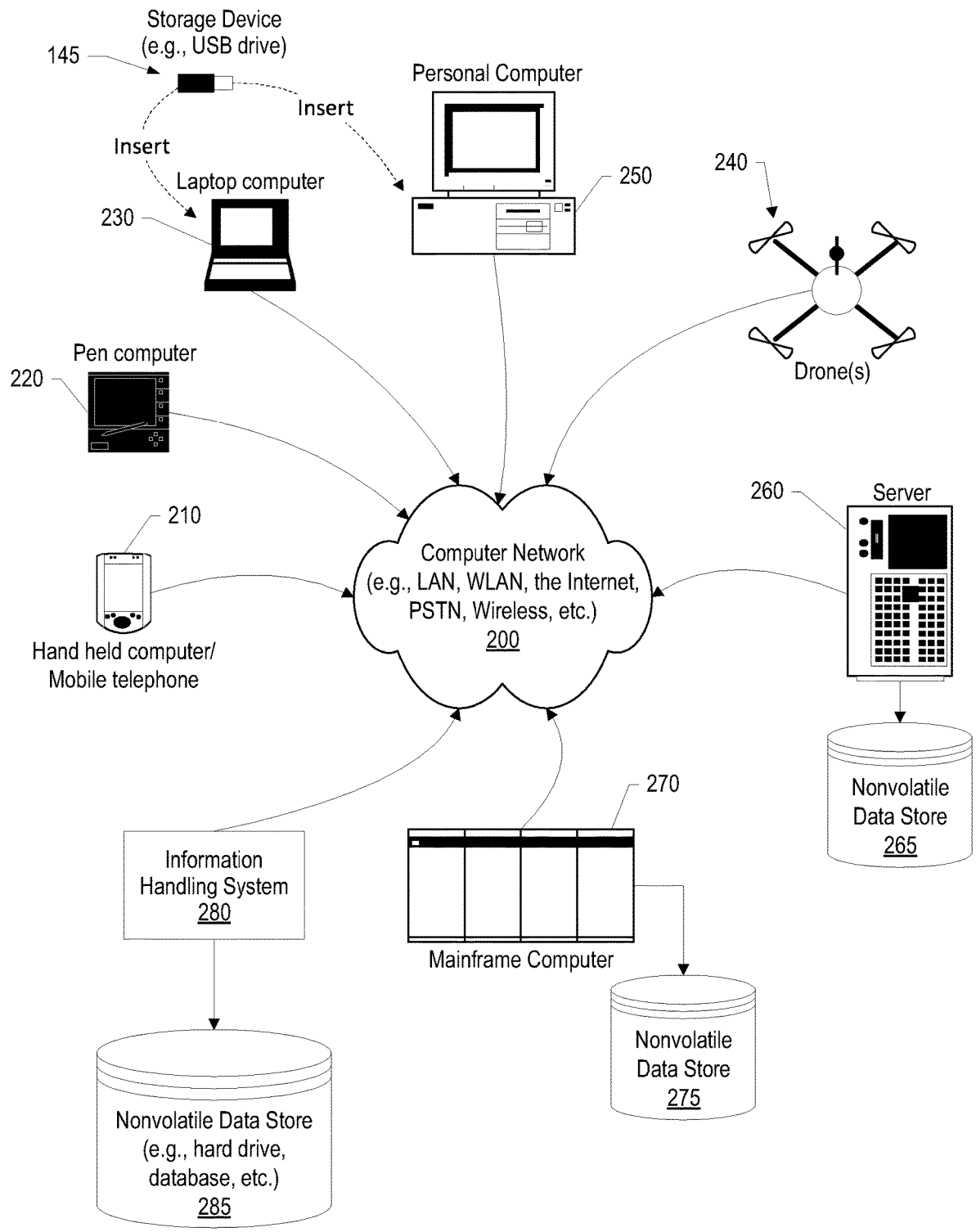
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
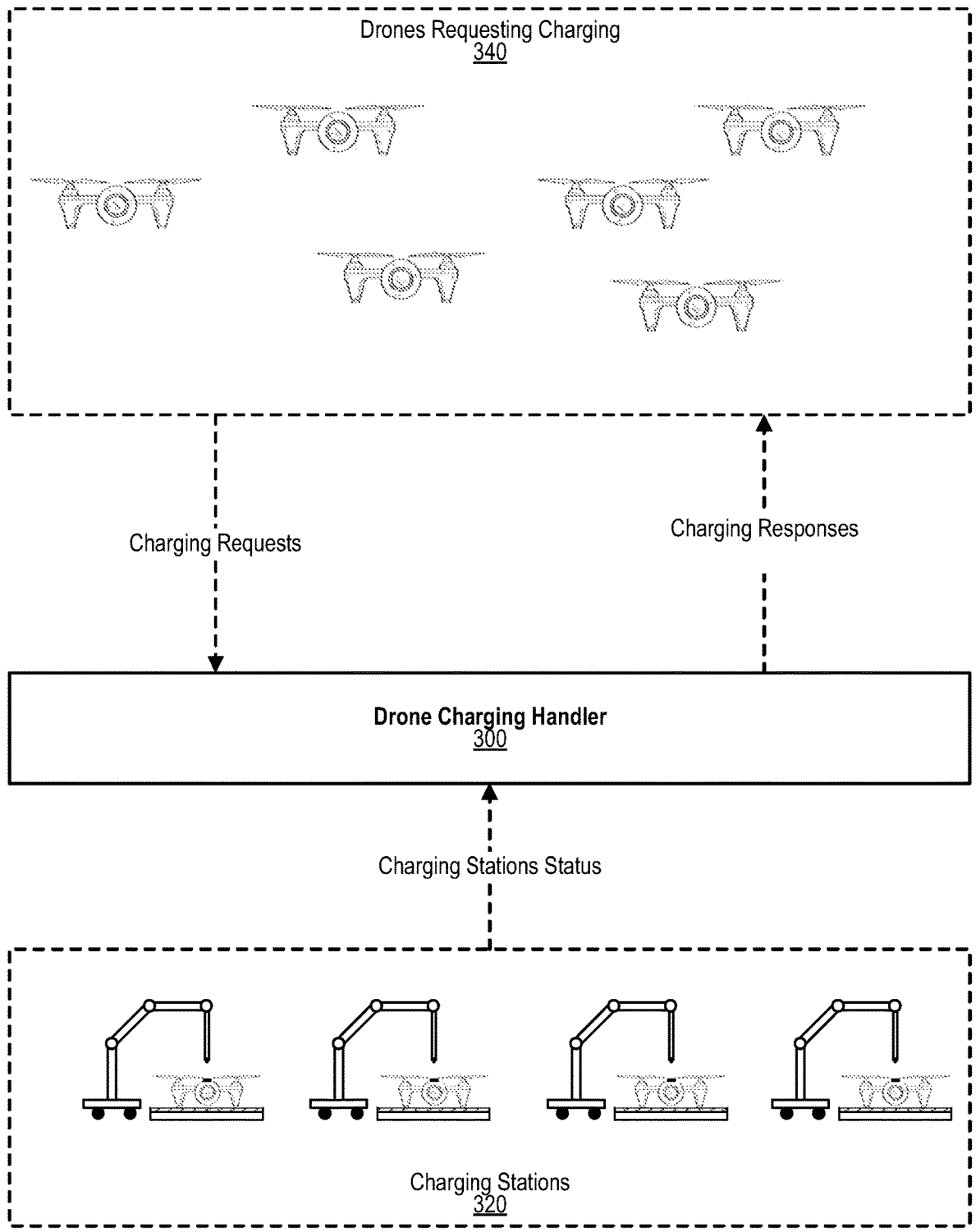
FIG. 3 is a component diagram depicting the components utilized in managing a set of drone charging stations.

FIG. 3 is a component diagram depicting the components utilized in managing a set of drone charging stations. Drones 340 that are in the vicinity or otherwise approaching charging stations 320 request to land and charge at one of the charging stations by sending a power charging request to drone charging handler 300. Drone charging handler manages access to charging stations 320. In one embodiment, the drone charging handler prioritizes requests from drones based on factors such as the amount of remaining battery power at the drones. If drone charging handler 300 approves a power charging request from a drone, the handler sends an approval notification to the respective drone along with charging information. In one embodiment, the charging information includes directions to a particular charging station that is assigned to the drone as well as an allowed arrival time as the charging station might be occupied by another drone until the allowed arrival time. The directions may be a particular set of GPS coordinates that identifies the specific charging station that has been assigned to the drone. In addition, the power charging instructions to the drone might include an expected departure time based on the estimated amount of time that the drone will take to charge given the drone's current battery charging level. On the other hand, if a power charging request is denied by the drone charging handler then the drone is sent a denial notification. The denial might also include denial reasons, such as a failure to authenticate the drone's identity or a failure to receive validated payment information, such as a valid credit card, etc. If a denial is sent to a drone and the drone still proceeds to land on one of the charging stations, then the drone is treated as a malfunctioning drone as the drone apparently did not receive or properly process the denial notification.

Figure 4:
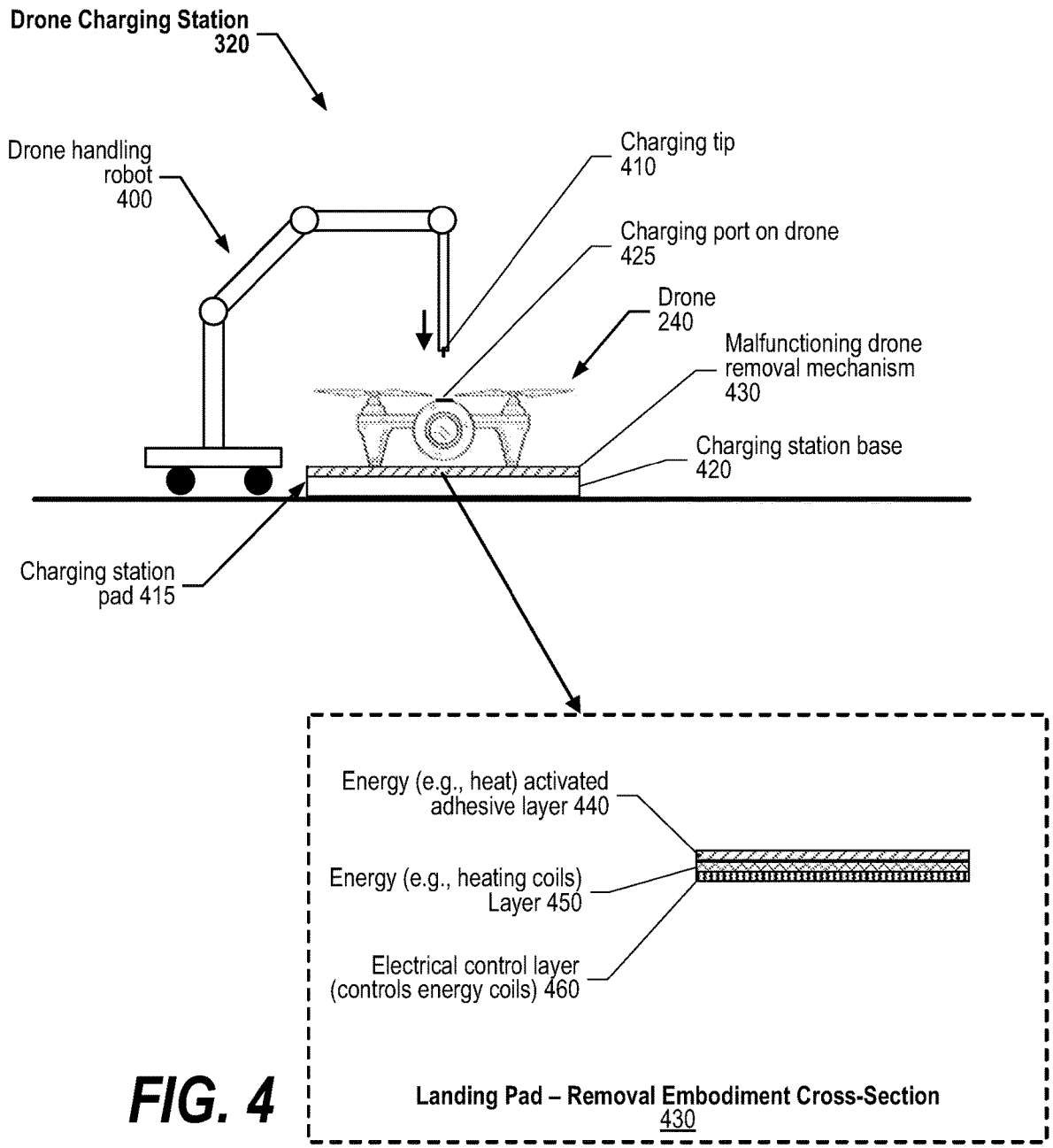
FIG. 4 is a depiction of a drone handling robot that assists drones at a charging station.

FIG. 4 is a depiction of a drone handling robot that assists drones at a charging station. Drone charging station 320 is shown with additional detail depicting drone handling robot 400 that assists with the charging of an authorized drone at the charging station as well as assisting in the safe securing and removal of a malfunctioning drone so that the malfunctioning drone can be returned to the drone's owner. Robot 400 includes charging tip 410 that is used to provide power (e.g., "plug into," etc.) the drone when being charged. In addition, robot 400 has mobility allowing the robot to move away from a drone that is malfunctioning so that the malfunctioning drone does not damage robot 400. Once a malfunctioning drone is secured, as described in greater detail below, drone 400 can be used to remove the malfunctioning drone from the charging station. In one embodiment, malfunctioning drones removed from charging stations are stored in a secure enclosure, similar to a small hanger, and the drone's owner is contacted regarding the drone's malfunction with instructions provided so that the owner can physically re-obtain the malfunctioning drone for repairs, etc.

Drone 240 is shown parked, or landed, on charging station pad 415. In one embodiment, charging station pad 415 includes multiple layers including charging station base 420 as well as malfunctioning drone removal mechanism layer 430. In a further embodiment, as further shown in the cross-section diagram of the malfunctioning drone removal mechanism layer, this layer includes a mechanism to safely secure a malfunctioning drone to the removal layer, such as with an energy activated adhesive, such as a heat activated adhesive. The layers that accomplish the safe securing of a malfunctioning drone include energy activated adhesive layer 440 that includes an adhesive in solid form that, when activated, becomes gel-like to adhere the bottom of the malfunctioning drone to layer 430. The adhesive layer is activated by energy layer 450, such as a layer with heating coils that, when heated, heat the adhesive in the adhesive layer to adhere the drone to layer 430. In addition, electrical control layer 460 is used to activate the heating layer to adhere the drone to layer 430 when the drone is detected as being a malfunctioning drone. Once secured, robot 400 moves the malfunctioning drone to a secure area, such as a small hanger. The owner is then instructed on how to physically obtain the malfunctioning drone from the operator of the charging station.

Figure 5:
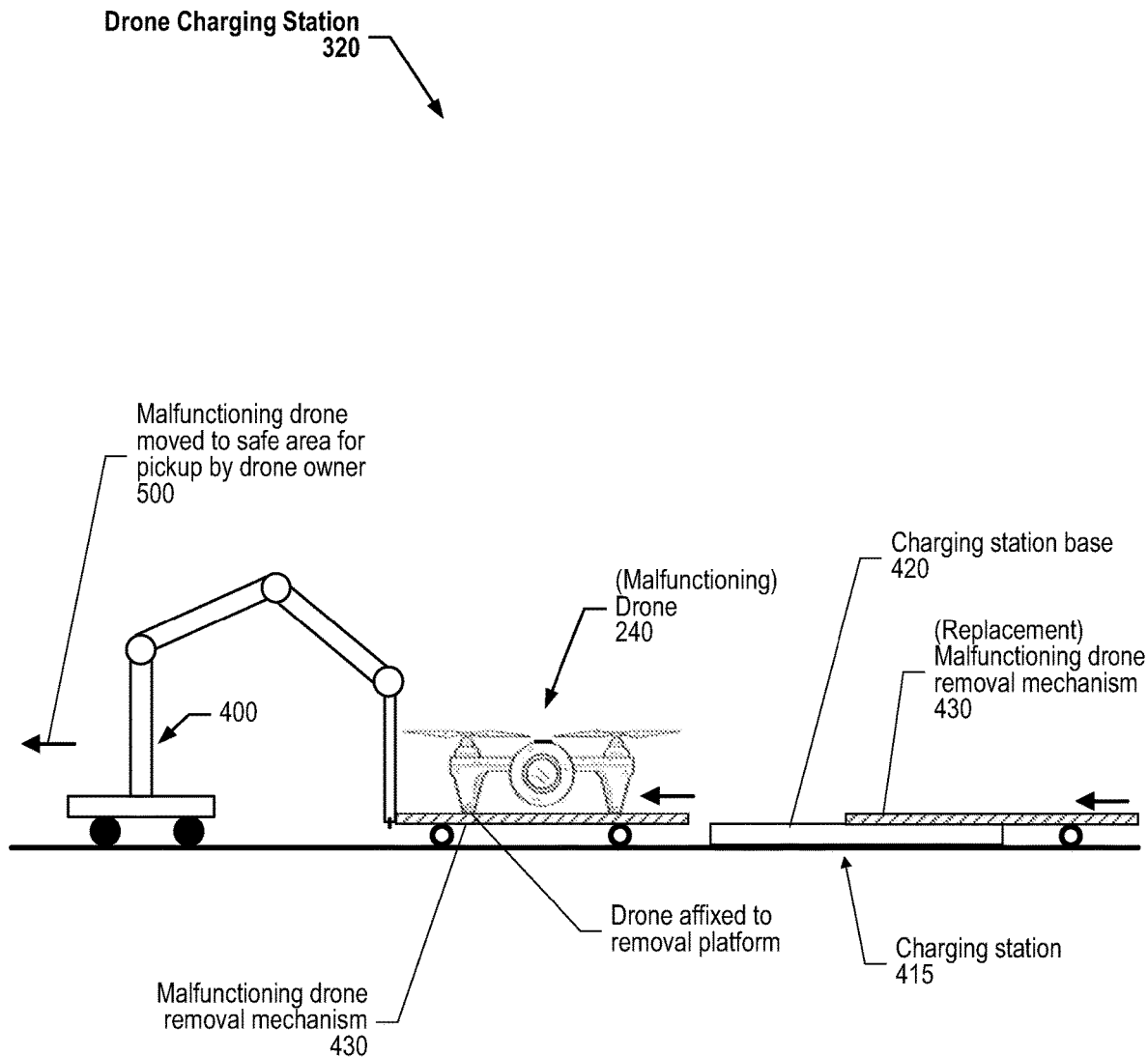
FIG. 5 is a diagram depicting the removal of a malfunctioning drone from a charging station.

FIG. 5 is a diagram depicting the removal of a malfunctioning drone from a charging station. In one embodiment, removal mechanism layer 430 has wheels that fit into slots in charging base 420 of charging station 415. In this manner, once a malfunctioning drone is secured to removal mechanism layer 430, drone 400 can pull layer 430 and it is wheeled away to a secure location 500 (e.g., small hanger, etc.). A fresh removal mechanism layer 530 is then pulled by the drone to sit on top of charging base 420. Subsequent drones then land on replacement removal mechanism layer 530 until such time as a malfunctioning drone is detected on this layer, whereupon the process is repeated with layer 530 being used to secure the next malfunctioning drone, robot 400 pulling layer 430 with the adhered drone to secured location 500.

Figure 6:
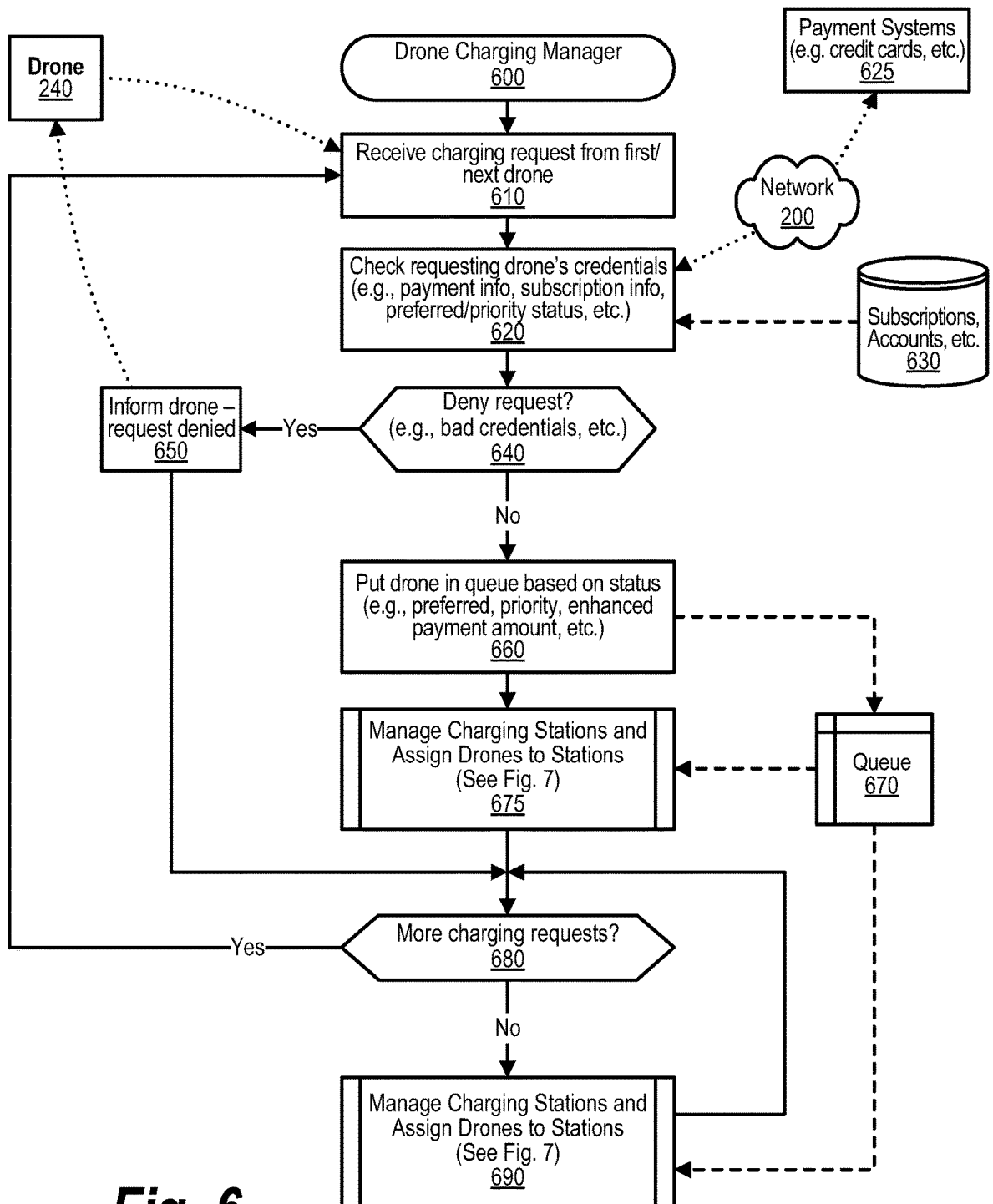
FIG. 6 is a flowchart depicting the logic performed by a drone charging manager that manages charging requests received from drones.

FIG. 6 is a flowchart depicting the logic performed by a drone charging manager that manages charging requests received from drones. FIG. 6 processing commences at 600 and shows the steps taken by a process that executes a drone charging manager that manages one or more drone charging stations. At step 610, the process receives a power charging request from the first drone 240. At step 620, the process checks the requesting drone's credentials, such as payment information, subscription information, any preferred/priority status, authentication data, and the like. Step 620 retrieves any needed data from data store 630 (e.g., subscription data, etc.) as well as receiving payment information from payment systems 625 via computer network 200.

The process determines whether to deny the drone's request based on a check of the received credentials (decision 640). If the request is denied, then decision 640 branches to the 'yes' branch whereupon, at step 650, the process informs the requesting drone that the request was denied with no charging station being assigned to the drone. On the other hand, if the request is approved, then decision 640 branches to the 'no' branch to perform steps 660 and 675.

At step 660, the process puts data corresponding to the drone in queue 670 based on the drone's status and the charging algorithm used (e.g., preferred, priority, enhanced payment amount, etc.). At predefined process 675, the process performs the Manage Charging Stations and Assign Drones to Stations routine (see FIG. 7 and corresponding text for processing details). This routine manages the drones that are allowed at charging stations at various times.

The process determines whether additional charging requests have been received from other drones (decision 680). If more charging requests have been received, then decision 680 branches to the 'yes' branch which loops back to step 610 to receive and process such additional requests as described above. This looping continues until no requests are being received, at which point decision 680 branches to the 'no' branch exiting the loop.

Figure 7:
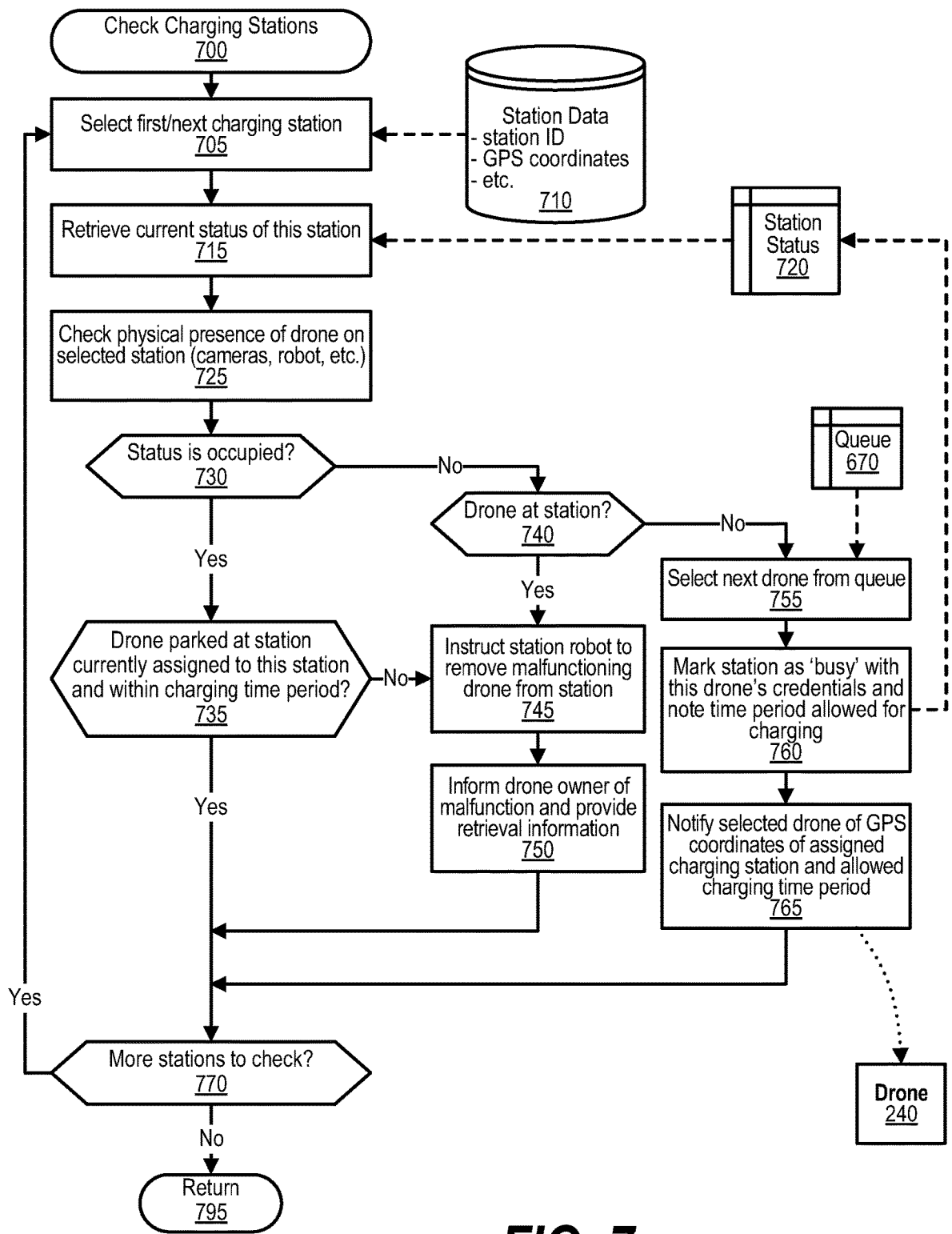
FIG. 7 is a flowchart depicting the logic used by the drone charging manager to manage multiple charging stations and assign drones in need to charging to particular charging stations.

At predefined process 690, the process performs the Manage Charging Stations and Assign Drones to Stations routine (see FIG. 7 and corresponding text for processing details). This routine is repeatedly performed to manage and monitor the various drone charging stations. Processing repeatedly loops back to determine if additional charging requests have been received and, when received, processing loops back to step 610 to process the request.

FIG. 7 is a flowchart depicting the logic used by the drone charging manager to manage multiple charging stations and assign drones in need to charging to particular charging stations. FIG. 7 processing commences at 700 and shows the steps taken by a process that monitors and manages the various drone charging stations. At step 705, the process selects the first charging station from the set of charging stations being managed by the routine. The drone charging station data is retrieved from data store 710 and includes data such as the charging station's unique identification and the station's unique physical (e.g., GPS, etc.) location. At step 715, the process retrieves current status of this station, such as the station being currently occupied or not occupied. The station's status is retrieved from memory area 720.

At step 725, the process checks for the physical presence of a drone at the selected charging station with the process using cameras, a robot, sensors, or other means to detect such physical presence. The process determines whether the status is occupied (decision 730). If the status is occupied, then decision 730 branches to the 'yes' branch whereupon decision 735 is performed. On the other hand, if the status is unoccupied, then decision 730 branches to the 'no' branch whereupon decision 740 is performed. The process determines as to whether a drone is currently occupying (parked) at the station and that this drone is currently assigned to this charging station and also that the drone is within any charging time period that has been established and communicated to the drone (decision 735).

If the drone that is currently occupying the station is currently assigned to this charging station and also within any established charging time period, then decision 735 branches to the 'yes' branch with the drone continuing to charge at the station. On the other hand, if either the drone is not assigned to this charging station or if the drone was assigned to the station but is now outside its permitted charging time slot (perhaps indicating that the drone is unable to leave due to a malfunction), then decision 735 branches to the 'no' branch whereupon, at step 745, the robot assisting this charging station is instructed to remove the malfunctioning drone by first securing the drone to the removal layer of the charging pad and then having the robot pull the malfunctioning drone to a secure location. At step 750, the drone's owner is informed of the drone's malfunction along with information regarding how the owner can physically obtain the drone from the charging station manager.

When the current status is unoccupied, the process determines whether a drone is physically at the station (decision 740). If a drone is at the station, then decision 740 branches to the 'yes' branch to perform the securing/removing of the malfunctioning drone at step 645 and the informing of the drone's owner that the drone has malfunctioned at 750. On the other hand, if a drone is not physically at the station, then decision 740 branches to the 'no' branch to perform steps 755 through 765.

At step 755, the process selects next drone from queue 670. At step 760, the process marks the station as 'busy' with the drone selected from the queue with the drone's credentials and time period allowed for charging stored as the station's status in memory area 720. At step 765, the process notifies the selected drone of the GPS coordinates of the assigned charging station and the charging time period that the drone is allowed to occupy the charging station.

After the selected charging station has been processed as described above, the process determines whether there are more stations to check (decision 770). If there are more stations to check, then decision 770 branches to the 'yes' branch which loops back to step 705 to select and process the next charging station that is being managed. This looping continues until all of the charging stations have been processed, at which point decision 770 branches to the 'no' branch exiting the loop. FIG. 7 processing thereafter returns to the calling routine (see FIG. 6) at 795.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor to manage drone charging stations, the method comprising:
   identifying a drone at a drone charging station wherein the identified drone is unauthorized to be at the drone charging station due to a denial of a power charge request of the drone and a detection that the drone remains at the drone charging station after the denial, wherein the power charge request includes one or more credentials, and wherein the denying of the power charge request is responsive to processing the one or more credentials, wherein the denying includes sending a request to the drone to leave the charging station;
   securing the drone in response to the drone being identified as unauthorized; and
   after the securing, removing the identified drone from the drone charging station.

2. The method of claim 1 further comprising:
  detecting that the drone remains at the drone charging station after a charging time to charge the drone has elapsed, wherein the identification that the drone is unauthorized is based on the detecting.

3. The method of claim 1 further comprising:
  detecting that the drone is malfunctioning, wherein the identification that the drone is unauthorized is based on the detecting.

4. The method of claim 1 wherein the securing further comprises adhering the identified drone to a pad of the charging station with an energy activated adhesive, and wherein the removing further comprises removing the pad upon which the identified drone is adhered.

5. The method of claim 1 further comprising:
  identifying a user of the identified drone after the securing; and
  notifying the identified user that the drone is secured, wherein the notification includes data regarding retrieval of the secured drone by the owner.

6. The method of claim 1 wherein the drone is one of a plurality of drones and wherein the charging station is one of a plurality of charging stations, wherein the method further comprises:
  receiving a set of drone data corresponding to one or more of the plurality of drones, wherein the set of drone data includes a current drone location and a current battery life corresponding to each of the one or more drones;
  validating the one or more drones to grant access to one of the plurality of charging stations;
  calculating a charging schedule for the one or more drones by analyzing the drone data upon validation; and
  assigning each of the one or more drones to a different one of the charging stations based on the calculated charging schedule.

7. An information handling system comprising:
  one or more processors;
  one or more data stores accessible by at least one of the processors;
  a memory coupled to at least one of the processors; and
  a set of computer program instructions stored in the memory and executed by at least one of the processors to manage drone charging stations by performing actions comprising:
  identifying a drone at a drone charging station wherein the identified drone is unauthorized to be at the drone charging station due to a denial of a power charge request of the drone and a detection that the drone remains at the drone charging station after the denial, wherein the power charge request includes one or more credentials, and wherein the denying of the power charge request is responsive to processing the one or more credentials, wherein the denying includes sending a request to the drone to leave the charging station;
  securing the drone in response to the drone being identified as unauthorized; and
  after the securing, removing the identified drone from the drone charging station.

8. The information handling system of claim 7 wherein the actions further comprise:
  detecting that the drone remains at the drone charging station after a charging time to charge the drone has elapsed, wherein the identification that the drone is unauthorized is based on the detecting.

9. The information handling system of claim 7 wherein the actions further comprise:
  detecting that the drone is malfunctioning, wherein the identification that the drone is unauthorized is based on the detecting.

10. The information handling system of claim 7 wherein the securing further comprises adhering the identified drone to a pad of the charging station with an energy activated adhesive, and wherein the removing further comprises removing the pad upon which the identified drone is adhered.

11. The information handling system of claim 7 wherein the actions further comprise:
  identifying a user of the identified drone after the securing; and
  notifying the identified user that the drone is secured, wherein the notification includes data regarding retrieval of the secured drone by the owner.

12. The information handling system of claim 7 wherein the drone is one of a plurality of drones and wherein the charging station is one of a plurality of charging stations, wherein the actions further comprise:
  receiving a set of drone data corresponding to one or more of the plurality of drones, wherein the set of drone data includes a current drone location and a current battery life corresponding to each of the one or more drones;
  validating the one or more drones to grant access to one of the plurality of charging stations;
  calculating a charging schedule for the one or more drones by analyzing the drone data upon validation; and
  assigning each of the one or more drones to a different one of the charging stations based on the calculated charging schedule.

13. A computer program product stored in a computer readable storage medium, comprising computer program code that, when executed by an information handling system, manages drone charging stations by causing the information handling system to perform actions comprising:
  identifying a drone at a drone charging station wherein the identified drone is unauthorized to be at the drone charging station due to a denial of a power charge request of the drone and a detection that the drone remains at the drone charging station after the denial, wherein the power charge request includes one or more credentials, and wherein the denying of the power charge request is responsive to processing the one or more credentials, wherein the denying includes sending a request to the drone to leave the charging station;
  securing the drone in response to the drone being identified as unauthorized; and
  after the securing, removing the identified drone from the drone charging station.

14. The computer program product of claim 13 wherein the actions further comprise:
  detecting that the drone remains at the drone charging station after a charging time to charge the drone has elapsed, wherein the identification that the drone is unauthorized is based on the detecting.

15. The computer program product of claim 13 wherein the actions further comprise:
  detecting that the drone is malfunctioning, wherein the identification that the drone is unauthorized is based on the detecting.

16. The computer program product of claim 13 wherein the securing further comprises adhering the identified drone to a pad of the charging station with an energy activated adhesive, and wherein the removing further comprises removing the pad upon which the identified drone is adhered.

17. The computer program product of claim 13 wherein the actions further comprise:
- identifying a user of the identified drone after the securing; and
- notifying the identified user that the drone is secured, wherein the notification includes data regarding retrieval of the secured drone by the owner.

* * * * *